Patented Sept. 20, 1949

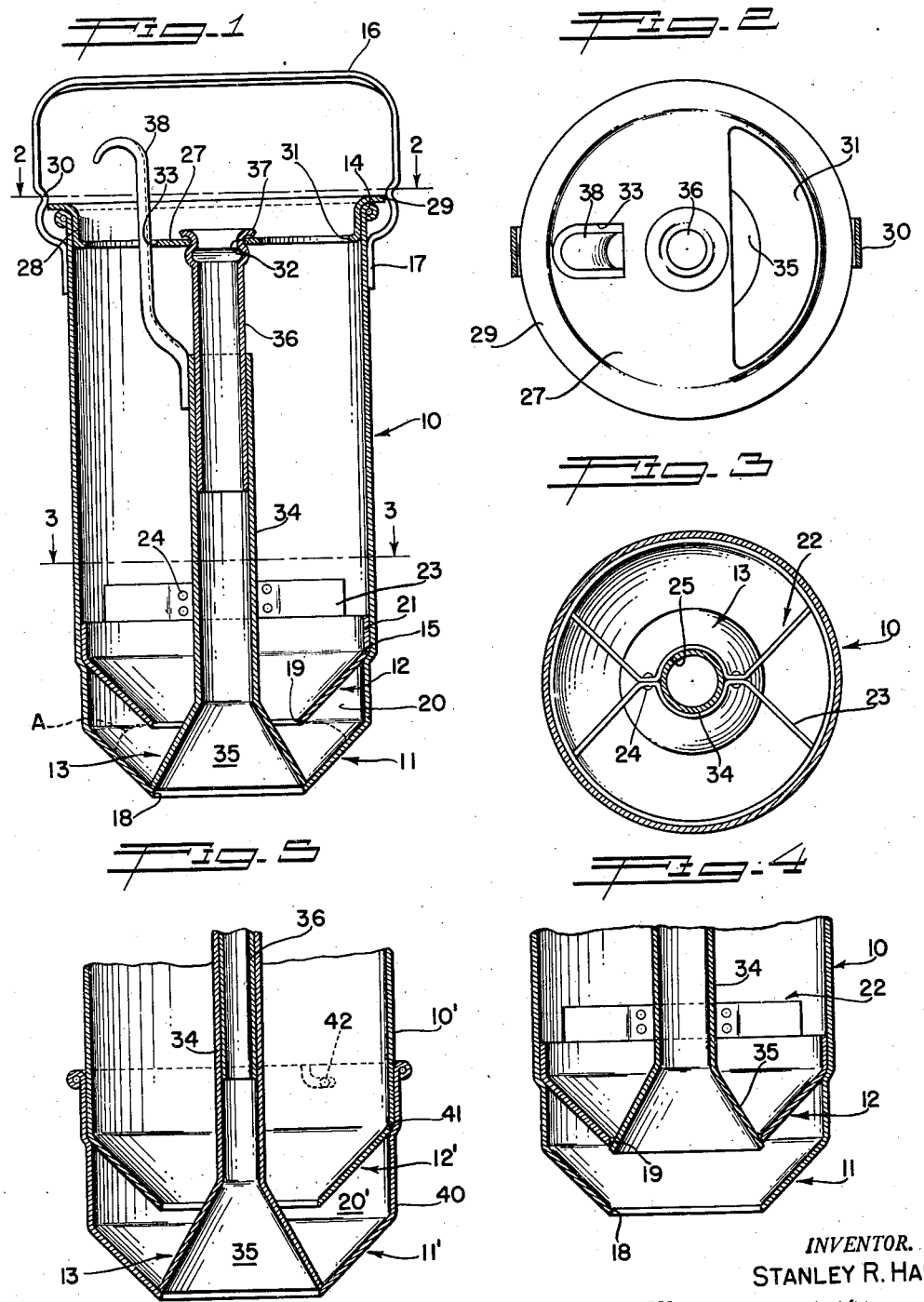

2,482,668

UNITED STATES PATENT OFFICE 2,482,668

DOMESTIC DOUGHNUT MACHINE

Stanley R. Hall, Burbank, Calif.

Application December 3, 1945, Serial No. 632,505

12 Claims. (Cl. 107—14)

This invention relates to doughnut formers, or doughnut machines, and relates more particularly to devices of this character primarily adapted for domestic use.

Doughnut machines of various constructions have been introduced for the quantity or large-scale production of doughnuts in bakeries and the like. Such prior machines are too costly for household use and are too heavy and cumbersome for use by a housewife. Furthermore, they are generally rather complicated, embodying dough-feeding and extruding means, cams, springs and similar parts which become clogged with the dough and therefore difficult to clean. Even the smaller types of doughnut machines with which I am familiar require springs, plungers and like parts which complicate the disassembling and cleaning and which materially increase the cost of production.

It is an important object of the present invention to provide a light-weight doughnut machine which is extremely simple and inexpensive to manufacture. The device of the invention may be readily produced at such a low cost that it may be sold in the usual merchandising outlets handling kitchen utensils, etc. While the invention is such that the machine may be of any size and type of construction, it is particularly well suited for embodiment in inexpensive devices capable of mass production and of sale at retail stores.

It is another important object of the invention to provide a doughnut machine of the character referred to which may be held and fully operated by one hand. The user merely holds the device over the cooking vessel with one hand and, while so holding it, operates the dough-delivering mechanism with one or more fingers of the same hand, leaving the other hand entirely free. There are no pistons or plungers to operate or spring resistance to overcome, and a minimum of manual effort is required for full operation of the device.

Another object of the invention is to provide a doughnut machine that will not become clogged with dough during operation and that is easy to disassemble and clean. The machine does not embody complicated valves, timing devices or springs liable to accumulate dough and does not include screws, nuts or similar securing means which are subject to detachment or loss and/or which require individual handling. The device involves a minimum number of simple parts that may be readily disconnected for full accessibility and cleaning.

A further object of the invention is to provide a doughnut machine of the class referred to that forms and discharges uniform well-shaped doughnuts without stringing out the dough or leaving irregulatrities. The invention includes a novel gravity, or automatic feed, controlled by a simple reciprocation of a frusto-conical former and cut-off member which serves to insure the discharge of annular bodies of dough of substantially uniform proportions and of circular transverse cross-section for direct delivery into the vessel of deep cooking fat. The conical former member moves between two spaced frusto-conical outlet walls to measure out intermediate charges of dough and detach them from the main body of dough in the hopper, to aid in forming the charges into doughnut-shape and to then separate or free the final doughnuts so that they may fall into the cooking vessel.

Other objects and advantages of the invention will become apparent from the following description of typical preferred embodiments wherein reference will be made to the accompanying drawings, in which:

Fig. 1 is a longitudinal detailed sectional view of a doughnut-forming machine of the invention showing the former member in the lowermost position;

Fig. 2 is a plan view of the device, being a view taken substantially as indicated by line 2—2 on Fig. 1;

Fig. 3 is a transverse detailed sectional view taken as indicated by line 3—3 on Fig. 1;

Fig. 4 is a fragmentary longitudinal sectional view of the lower portion of the device showing the former member in the raised position; and Fig. 5 is a view similar to Fig. 4, showing an alternative, or modified, form of construction.

The doughnut machine illustrated in Figs. 1 to 4, inclusive, of the drawings may be said to comprise generally a container 10 for the dough, two spaced co-axial walls, or outlets, 11 and 12 at the lower end of the container, and a guided former 13 movable between the outlets 11 and 12 for forming and releasing the doughnuts.

The container 10 constitutes the body of the device and is adapted to receive a substantial quantity of dough. While the container may be of any selected configuration, it will usually be preferred to make it cylindrical and elongated, substantially as illustrated. To simplify the construction and reduce the cost of manufacture, the container 10 is preferably a simple one-piece member formed of sheet metal stock, thin-walled aluminum tubing, or the like. The upper edge of the container 10 is provided with a rolled bead 14 and the cylindrical wall of the container is stepped inwardly, or reduced in diameter, in a plane some distance above its lower end, to provide an upwardly-facing internal annular shoulder 15 on the container wall. In order to facilitate handling and manipulation of the device, a handle 16 is provided at the upper end of the container. The handle 16 may be a simple bail-like member having the lower ends of its side parts secured to the external surface of the container at 17 by spot welding or riveting. The side parts of the handle 16 curve outwardly and upwardly from their points 17 of attachment to the container 10 and then continue vertically upward to join the horizontal grip portion which extends diametrically over the upper end of the container. The horizontal grip portion of the handle 16 is preferably transversely curved so as to be stiffened and to be more conveniently grasped. It is to be noted that the handle 16 is positioned at a point most remote from the doughnut cooking fat so that there is no danger of the fat splashing or splattering onto the user's hand grasping the handle.

The two outlets 11 and 12 are in the nature of spaced walls shaped and related to facilitate the controlled and yet ready delivery of the dough and to assist the former 13 in shaping the doughnuts. In the embodiment of the invention illustrated in Figs. 1 to 4, inclusive, the wall, or outlet, 11 is integral with the container 10, being in the form of an inturned continuation of the container wall. The wall, or outlet, 11 is an inverted frusto-conical part sloping downwardly and inwardly from the cylindrical wall of the container toward the central longitudinal axis of the machine. I prefer to slope or pitch the wall 11 at an angle of between 45 degrees and 55 degrees, although this may be varied considerably as desired. The wall, or outlet, 11 terminates at its lower end at an opening 18 through which the formed doughnut passes or discharges at the completion of each operation. The opening 18 is concentric with the central longitudinal axis of the device and is round, or cylindrical.

The outlet 12 is a partition, or wall, similar to and spaced above the outlet 11. As best illustrated in Figs. 1 and 4, the outlet 12 is an inverted frusto-conical part parallel with the wall or outlet 11 and terminating at its lower end in an opening 19. The opening 19 is preferably of the same diameter as the opening 18 and is concentric therewith. The vertical spacing of the outlets 11 and 12 leaves a metering, or measuring, chamber 20 for the dough which is to constitute the doughnuts. In the embodiment of the invention being described the wall, or outlet, 12 is a removable member inserted in the container 10 and adapted to be readily withdrawn therefrom when the machine is to be cleaned subsequent to use. A vertical cylindrical rim 21 is formed on the upper end of the outlet 12 to rather closely fit within the container 10. The rim 21 rests upon the above-described shoulder 15 to support the wall, or outlet, 12 against downward displacement.

A removable spider, or retainer, 22 is provided to resist upward displacement of the outlet 12 and to assist in guiding the former 13, as will be later described. The retainer and guide 22 comprises two identical but oppositely-arranged strips of sheet metal, or the like, each formed to have an intermediate or central portion and two angularly related end parts, or arms, 23. The central portions of the strips are secured together at 24 by rivets or spot welds and are shaped to define a vertical opening 25 which is co-axial with the central longitudinal axis of the machine and adapted to receive the former stem. The angular arms 23 extend outwardly to the wall of the container 10 and have frictional engagement therewith to resist upward displacement of the wall 12. While the primary function of the retainer and guide 22 is to steady and direct the former 13 during operation, it additionally serves to assist in holding the outlet 12 in place against the shoulder 15. The weight of the main body of dough in the container 10 also operates to hold the wall, or outlet, 12 against upward movement. Although the arms 23 of the guide 22 frictionally bear against the wall of the container 10 to resist movement, the guide may be deliberately withdrawn from the container as will be subsequently described.

It is preferred to provide a top, or cover, 27 for the upper end of the container 10. The cover 27 is a disc-like part having an upturned annular flange 28 at its periphery for fitting within the upper end portion of the container. The flange 28 is cylindrical and has a considerable vertical dimension so as to have extensive engagement with the internal surface of the container. The frictional engagement of the flange 28 with the container 10 dependably resists displacement of the cover. An outturned substantially horizontal rim 29 is provided on the flange 28 to engage downwardly against the bead 14 of the container to support the cover. While the frictional engagement of the flange 28 in the container 10 may be sufficient to prevent detachment of the cover 27 during operation of the device, it may be desirable to provide latch means to assist in holding the cover in place. In the drawings I have shown a latch means comprising inwardly bent projections, or detents, 30 in the vertical side parts of the handle 16. The detents 30 are shaped and positioned to engage the peripheral corner, or edge, of the rim 29 and yieldingly resist upward movement of the cover 27. When the cover 27 is assembled on the container 10, the edge of the rim 29 snaps under the two diametrically opposite detents 30. In a like manner, when the cover is removed the rim 29 is forced upwardly past the detents. A filling opening 31 of substantial size is provided in the cover 27 to allow the dough to be poured into the container 10. The cover also has a central cylindrical opening 32 and off-set opening 33.

The former 13 is the only movable element of the machine and serves to measure out the charges of dough and shape them into perfect doughnuts. In accordance with the invention, the former 13 is an elongate tubular member constructed of thin-walled tubing or sheet metal to resemble an inverted funnel having a tubular stem 34 provided at its lower end with a downwardly and outwardly sloping skirt, or conical dough-forming part 35. The stem 34 is slidably guided in the aforementioned central opening 25 of the guide 22 and extends centrally upward within the container 10. It is important to accurately direct the former 13 for vertical reciprocation, and the stem 34 is further guided by a guide 36 on the cover 27. The guide 36 is in the form of a tube secured in the opening 32 to project downwardly from the cover 27. The guide 36 may be secured in the opening 32 in any appropriate manner. For example, it may be beaded and flared as at 37, to be permanently fixed in the opening. As illustrated in the drawings, the guide 36 is of sufficient length to have extensive engagement with the interior of the tubular stem 34 of the former 13. It is to be observed that the former 13 is supported and guided for free vertical movement by two vertically spaced parts, namely, the guides 22 and 36.

Handle means is provided on the former 13 to facilitate its operation. This may consist of a simple handle 38 secured to the upper portion of the stem 34 by welding, or the like, to extend upwardly and pass through the opening 33 in the cover 27. The upper portion of the handle 38 is bent, or curved, outwardly and downwardly to be conveniently engaged by one or more fingers of the user's hand grasping the main handle 16.

The curved upper portion of the handle 38 is preferably adjacent one side of the main handle 16 so that it may be easily operated by the user's first finger.

The active conical part 35 of the former 13 cooperates with the above-described outlets, or walls, 11 and 12. When the former 13 is in the lowermost position shown in Fig. 1, the lower edge of the forming part 35 engages the wall 11 immediately adjacent its opening 18 and the part 35 is clear of or spaced within the opening 19 of the wall 12. In this connection it is to be noted that the conical skirt, or former, 35 is of sufficient size to extend some distance through the opening 19. With the former 13 in the position of Fig. 1, the dough is free to flow downwardly through the opening 19 into the chamber 20. The dough thus entering the chamber 20 is obliged to flow around the sloping wall of the conical former part 35 in the form of an annular body or mass. The pitched or sloping wall 12 guides or directs the dough for passage through the opening 19 around the former part 35. Because of its heavy consistency, the dough will not fully occupy the chamber 20 but will assume a position and contour therein substantially as indicated by the broken lines A in Fig. 1. The external surface of the former part 35 has a substantial pitch, or inclination, to facilitate the flow of the dough into the chamber 20 and to assist in shaping the doughnut.

When the doughnut former 13 is raised to the position illustrated in Fig. 4, the lower portion of the part 35 comes into engagement with the wall 12 at the lower edge of its opening 19. This severs the body of dough in the chamber 20 from the main mass of dough in the container 10 and as the opening 18 in the lower outlet wall 11 is no longer obstructed, the dough in the chamber is free to move downwardly through the opening 18. During the upward movement of the former 13 as just described, its conical part 35 moves through the dough in the chamber 20 to further shape the same, and as the dough slides or moves outwardly through the opening 18 the conical wall 11 assists in shaping the doughnut. Thus the opposed or oppositely pitched and relatively movable conical surfaces of the former part 35 and the wall 11 give the free body of dough a perfect doughnut configuration. Upon downward movement of the former 13 to the position of Fig. 1, the lower edge of the part 35 is brought into engagement with the wall 11 at the opening 18, to cut free or sever the doughnut from the dough that may remain in the chamber 20. This obviates the possibility of the dough stringing out as the doughnut falls free into the cooking fat. From the above it will be seen that simple reciprocation of the former 13 produces well-shaped doughnuts. In practice, if desired, the speed of operation of the former 13 may be controlled to modify to some extent the size of the resultant doughnut.

In the alternative construction of Fig. 5 the upper outlet wall 12' is an integral part of the container 10' and the lower wall 11' is a separable part. The wall 11' has an upwardly extending cylindrical sleeve, or skirt, 40 which defines the side wall of the chamber 20. The upper part of the skirt 40 telescopes or engages around the exterior of the container 10' and has an annular internal shoulder 41 for cooperating with the wall 12'. Quick threads, or bayonet-type connections, 42 are provided to releasably connect the wall 11' to the lower portion of the container 10'. In the device of Fig. 5 the above-described retainer and guide 22 is not required but is preferred to make the guide 36 somewhat longer to properly guide the former 13. In other respects the device of Fig. 5 may be the same as illustrated in Figs. 1 to 4, inclusive.

From the above detailed description it will be seen that I have provided an extremely simple, inexpensive doughnut machine which embodies a minimum number of parts. The several elements of the device may be readily formed or spun from sheet metal. The device is simple to assemble and disassemble and there are no screws, bolts, or the like, to become detached and lost. Referring to Fig. 1, the device is easily taken apart for cleaning by merely disconnecting the cover 27 from the container 10 and then raising the former 13 by means of its handle 38. When the former 13 is withdrawn upwardly through the container 10, its lower conical part 35 lifts both the wall 12 and the guide 22 from the container.

Having described only typical preferred forms of the invention, I do not wish to be limited to the specific details herein set forth, but wish to reserve to myself any features and modifications that may fall within the scope of the following claims.

I claim:

1. A doughnut machine comprising a container, a first conical wall at the lower end of the container having an opening communicating with the interior of the container, a second conical wall spaced below said first wall and having an opening aligned with the first-named opening, and a tubular frusto-conical forming member having an open lower end terminating in a lower edge and movable between a position where its lower edge engages said second wall at said second opening to close said second-named opening and, leaving first-named opening open and a position where its lower end portion engages said first wall at said first-named opening to close the latter, leaving said second-named opening free.

2. A doughnut machine comprising a container, a first wall at the lower end of the container having an opening communicating with the interior of the container, a second wall spaced below the first wall and having an outlet opening aligned with the first-named opening, and a vertically movable former having a downwardly and outwardly flaring part for alternately having substantially line contact with said first and second walls at their respective openings upon reciprocation of the former.

3. A doughnut machine comprising a dough container, a first wall at the lower end of the container having an opening communicating with the interior of the container, a second wall spaced below the first wall and having an outlet opening aligned with the first-named opening, said walls sloping downwardly and inwardly to their respective openings, a vertically movable former having a conical part presenting a downwardly and outwardly flaring surface and a downwardly facing lower edge, said former being movable between a first position where said edge engages said second wall to close the opening therein and where there is an annular passage through the opening in said first wall for the flow of dough into the space between the walls, and a second position where said flaring surface engages in the opening in said first wall to close the same and where said former is clear of the said second wall to leave the opening therein unobstructed for the discharge of said dough, and means in the container for guiding the former for vertical movement.

4. A doughnut machine comprising a dough container, a first wall at the lower end of the container having an opening communicating with the interior of the container, a second wall spaced below the first wall and having an outlet opening aligned with the first-named opening, said walls sloping downwardly and inwardly to their respective openings, a vertically movable former having a conical part presenting a downwardly and outwardly flaring surface and a downwardly facing lower edge, said former being movable between a first position where said edge engages said second wall to close the opening therein and where there is an annular passage through the opening in said first wall for the flow of dough into the space between the walls and a second position where said flaring surface engages in the opening in said first wall to close the same and where it is clear of the said second wall to leave the opening therein unobstructed for the discharge of said dough, and means accessible at the upper end of the container for operating the former.

5. A doughnut machine comprising a dough container, a first wall at the lower end of the container having an opening communicating with the interior of the container, a second wall spaced below the first wall and having an outlet opening aligned with the first-named opening, said walls sloping downwardly and inwardly to their respective openings, a vertically movable former having a conical part presenting a downwardly and outwardly flaring surface and a downwardly facing lower edge, said former being movable between a first position where said edge engages said second wall adjacent the opening therein to close the opening therein and where there is an annular passage through the opening in said first wall for the flow of dough into the space between the walls and a second position where said flaring surface engages in the opening in said first wall to close the same and where it is clear of the said second wall to leave the opening therein unobstructed for the discharge of said dough, a handle on the upper end of the container for supporting the same, and a handle for operating said former between said positions located to be engageable by the hand grasping the first handle.

6. A doughnut machine comprising a dough container, a first wall at the lower end of the container having an opening communicating with the interior of the container, a second wall spaced below the first wall and having an outlet opening aligned with the first-named opening, said walls sloping downwardly and inwardly to their respective openings, a vertically movable former having a conical part presenting a downwardly and outwardly flaring surface and a downwardly facing lower edge, said former being movable between a first position where said edge engages said second wall adjacent the opening therein to close the opening therein and where there is an annular passage through the opening in said first wall for the flow of dough into the space between the walls and a second position where said flaring surface engages in the opening in said first wall to close the opening in said first wall and where it is clear of the said second wall to leave the opening therein unobstructed for the discharge of said dough, and vertically-spaced guides in the container guiding the former for vertical movement.

7. A doughnut machine comprising a dough container, a first wall at the lower end of the container having an opening communicating with the interior of the container, a second wall spaced below the first wall and having an outlet opening aligned with the first-named opening, said walls sloping downwardly and inwardly to their respective openings, a vertically movable former including an upright stem and a conical doughnut forming part on the lower end of the stem presenting a downwardly and outwardly sloping surface terminating at a downwardly facing lower edge, means for moving the former between a position where said edge engages the second wall to close the opening therein and where said former is clear of the first wall to leave an annular passage through the opening in the first wall for the flow of dough from the container into the space between the walls and a position where said sloping surface engages in the opening in the first wall to close the opening therein and where said part is above said second wall to leave the opening therein free for the discharge of the dough in the form of a doughnut, and means cooperating with the stem to guide the former for movement between said positions.

8. A doughnut machine comprising a dough container, a first wall at the lower end of the container having an opening communicating with the interior of the container, a second wall spaced below the first wall and having an outlet opening aligned with the first-named opening, said walls sloping downwardly and inwardly to their respective openings, a vertically movable former including an upright stem and a conical forming part on the lower end of the stem presenting a downwardly and outwardly sloping surface terminating at a downwardly facing lower edge, means for moving the former between a position where said edge engages the second wall to close the opening therein and where said former is clear of the first wall to leave an annular passage through the opening in the first wall for the flow of dough from the container into the space between the walls and a position where said sloping surface engages in the opening in the first wall to close the opening therein and where said part is above said second wall to leave the opening therein free for the discharge of the dough in the form of a doughnut, a cover on the container, and a guide extending downwardly from the cover to slidably guide the stem of the former.

9. A doughnut machine comprising a doughnut container, a first wall at the lower end of the container having an opening communicating with the interior of the container, a second wall spaced below the first wall and having an outlet opening aligned with the first-named opening, said walls sloping downwardly and inwardly to their respective openings, a vertically movable former including an upright stem and a conical doughnut-forming part on the lower end of the stem presenting a downwardly and outwardly sloping surface terminating at a downwardly facing lower edge, means for moving the former between a position where said sloping surface engages the second wall to close the opening therein and where said part is clear of the first wall to leave an annular passage through the opening in the first wall for the flow of dough from the container into the space between the walls and a position where said sloping surface engages in the opening in the first wall to close the opening therein and where said part is above said second wall to leave the opening therein free for the discharge of the dough, a member removably engaged in the container for guiding the lower part of said stem, a cover on the container, and means on the cover for guiding the upper portion of the stem.

10. A doughnut machine comprising a container for dough, a wall integral with the container and sloping downwardly and inwardly from its lower end, there being a central opening in said wall, a member removably supported in the container having a downwardly and inwardly sloping wall spaced above the first-named wall, the second-named wall having a central opening, and a conical former reciprocable vertically and presenting a downwardly and outwardly flaring surface terminating at its lower end in a downwardly facing edge, said surface and edge being adapted upon reciprocation of said former to alternately engage said walls in a manner to close their openings.

11. A doughnut machine comprising a container for dough, a wall integral with the container and sloping downwardly and inwardly from its lower end, there being a central opening in said wall, a member removably secured to the container and having a downwardly and inwardly sloping wall spaced below the first-named wall, and a vertically reciprocable former including a stem extending vertically within the container, and a conical part on the stem presenting a downwardly and outwardly flaring surface terminating at its lower end in a downwardly facing edge, said part being reciprocable between said walls so that said surface and edge alternately cooperate with the first and second-named walls respectively to alternately open and close their respective openings.

12. A doughnut machine comprising a dough container, a handle extending across the upper end of the container adapted to be grasped in one hand to support the machine, vertically spaced substantially parallel walls at the lower end of the container sloping downwardly and inwardly and each having a central dough-passing opening, a cover removably engaged in the upper end of the container, a downwardly extending guide on the cover, a stem slidable on the guide, a conical dough-forming part on the lower end of the stem presenting a downwardly and outwardly flaring surface terminating at its lower end in a downwardly facing edge, said surface and edge being adapted to alternately move into and out of engagement with said walls at their openings upon reciprocation of the stem to alternately open and close said openings and to form charges of dough into doughnuts, said cover having an opening, and an operating handle on the stem extending upwardly through the opening in the cover to be operated by a finger of the hand grasping the first-named handle.

STANLEY R. HALL.

REFERENCES CITED

The following references are of record in the file of this patent:

UNITED STATES PATENTS

| Number | Name | Date |
|---|---|---|
| 576,241 | Van Ame | Feb. 2, 1897 |
| 1,863,871 | Packwood, Jr. | June 21, 1932 |
| 2,067,523 | Finney | Jan. 12, 1937 |
| 2,175,543 | Valle | Oct. 10, 1939 |
| 2,197,270 | Helland | Apr. 16, 1940 |